UNITED STATES PATENT OFFICE.

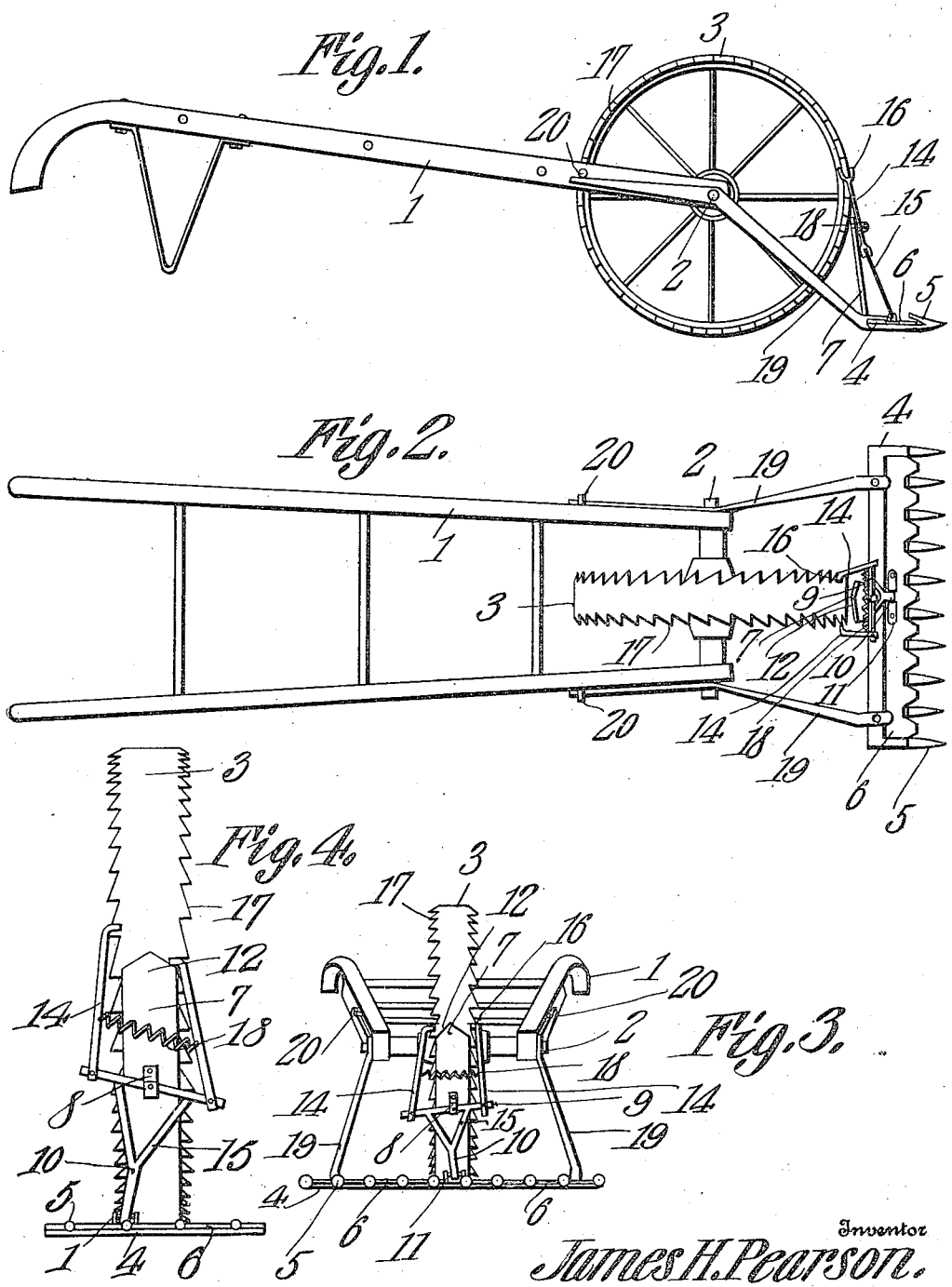

JAMES H. PEARSON, OF WESTPLAINS, MISSOURI.

LAWN-MOWER.

950,008. Specification of Letters Patent. Patented Feb. 22, 1910.

Application filed June 30, 1909. Serial No. 505,256.

*To all whom it may concern:*

Be it known that I, JAMES H. PEARSON, a citizen of the United States, residing at Westplains, in the county of Howell and State of Missouri, have invented a new and useful Lawn-Mower, of which the following is a specification.

The objects of the invention are, generally, the provision, in a merchantable form, of a device of the above mentioned class, which shall be inexpensive to manufacture, facile in operation, and devoid of complicated parts; specifically, the provision of lawn mower mechanism adapted to be removably assembled with a truck, the said lawn mower mechanism comprising a cutter-bar adapted to reciprocate in front of the truck, novel means being provided for procuring a reciprocation of the cutter-bar upon a rotation of the wheel of the truck, the cutter-bar and the wheel of the truck being operatively connected in a novel and improved manner; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive and peculiar features of the device, it being understood that, within the scope of what hereinafter thus is claimed, divers changes in the form, proportions, size, and minor details of the structure may be made, without departing from the spirit or sacrificing any of the advantages of the invention.

Similar numerals of reference are employed to denote corresponding parts throughout the several figures of the drawings.

In the accompanying drawings:—Figure 1 shows my invention in side elevation; Fig. 2 is a top plan; Fig. 3 is an end elevation; and Fig. 4 is a fragmental front elevation upon an enlarged scale, one of the pawls being shown as moving downwardly and about to be disengaged from the toothed wheel by the standard, the other pawl being shown as moving upwardly and about to be engaged for depression by a tooth of the wheel.

In carrying out my invention, I provide, primarily, a truck, which includes a frame 1, through the extremity of which is passed transversely an axle 2, the ends of the said axle being arranged to outstand beyond the frame of the truck. The axle 2 carries a wheel 3, disposed between the side beams of the truck. The invention further includes a cross-bar which is disposed in front of the wheel 3, transversely of the device, the cross-bar, which is denoted by the numeral 4, being provided with rearwardly extending resilient arms 19. These arms 19 as they extend rearwardly, converge, and, intermediate their ends, are apertured to receive the portions of the axle 2 which extend laterally beyond the frame 1. The arms 19 are therefore pivoted upon the axle 2, the rear extremities of the arms embracing the frame 1 closely. In order to restrain the rear extremities of the arms 19, the side beams of the frame are provided with outwardly extending lugs 20, to engage the said extremities of the arms.

The cross-bar 4 is provided with guard fingers 5, of any approved form, through which is adapted to reciprocate a cutter-bar 6, which is slidably mounted upon the cross-bar 4. The forward extremities of the arms 19 contact with the cutter-bar 6 and serve to restrain it in place upon the cross bar 4.

Fixed to and rising from the cross-bar 4, intermediate its ends, is a standard 7, provided upon its forward face with a hanger 8, in which is mounted, intermediate its ends, a pitman 15, comprising a head 9, which is immediately mounted in the hanger 8, and a depending finger 10, which is adapted to register between upstanding lugs 11, which are mounted upon the upper face of the cutter-bar 6. Pivotally mounted upon the extremities of the head 9 of the pitman, are upright pawls 14, having their upper extremities disposed upon opposite sides of the rim of the wheel 3. The rim of the wheel 3 is notched to form outstanding teeth 17, the teeth upon one edge of the rim of the wheel being out of alinement, transversely of the wheel, with the teeth upon the opposite edge thereof. The upper extremities of the pawls 14 are adapted to engage these teeth 17 in the rim of the wheel, the pawls being held normally in engagement with the teeth by means of a resilient element 18, uniting the pawls 14 intermediate their ends. The upper extremities of the pawls 14 are forked, as denoted by the numeral 16. These forked ends of the pawls are inbent toward each other, and they exercise a double function. First, they serve to retain the pawls against forward or rearward movement, whereby their engagement with the teeth of the wheel might be broken. In the second instance, those branches of the forked ends 16 of the pawls which extend in front of the rim of the wheel are adapted to engage, alternately, the pointed upper extremity 12 of the standard 7, whereby first one of the pawls 14 and then the other thereof, may be pushed laterally to break the engagement between the particular pawl and the teeth 17 of the wheel.

The operation of the device is as follows:— When the truck is pushed forward, one of the teeth 17 upon one side of the wheel will engage one of the pawls 14, causing the same to move downward. This downward movement of the pawl 14 will cause the head 9 of the pitman to tilt, causing the depending finger 10 of the pitman to engage the lugs 11 of the cutter-bar 6, forcing the cutter-bar to one side. When the pawl has moved downward a sufficient distance, the forked end 16 which extends in front of the rim of the wheel will come into engagement with the pointed extremity 12 of the standard 7, whereby the pawl, at its upper end, will be moved laterally out of engagement with the tooth of the wheel. The opposite pawl will then engage the teeth of the wheel and move downward, causing the cutter-bar 6 to make a stroke in the opposite direction, the first named pawl being lifted in the operation, the resilient element 18 drawing the free extremity of the last named pawl into engagement with another notch upon the wheel. It will thus be seen that the pawls 14 are alternately in engagement with the teeth of the wheel, whereby the cutter-bar 6 is moved first in one direction and then in the other, the forked ends 16 which extend in front of the rim of the wheel being alternately engaged by the pointed ends of the standard 7, whereby the pawls will be alternately lifted free from the teeth, so that the pawls may move upward to be engaged by another tooth upon the wheel.

The truck upon which the device is mounted may be disassociated readily from the lawn mower mechanism, whereupon the truck may be assembled with a seeder, a light shovel plow, or any other implement which is commonly mounted upon a truck of the character shown in the drawings.

Having thus described my invention, what I claim as new, and desire to protect, by Letters Patent, is:—

1. A device of the class described comprising a frame; an axle transversely mounted in the frame and terminally extended therebeyond; an earth-engaging wheel carried by the axle; a cross-bar; resilient arms rearwardly extending from the cross-bar and arranged to engage in their intermediate portions, the extended portions of the axle, and to engage terminally, the frame; lugs to engage the extremities of the arms, located upon the frame; a cutter-bar slidably mounted upon the cross-bar; and means operatively connecting the wheel and the cutter-bar to secure a reciprocation of the latter upon a rotation of the former.

2. A device of the class described comprising a frame; an earth-engaging wheel carried by the frame and provided upon either side with outstanding teeth; a cross-bar rigidly assembled with the frame; a cutter-bar slidably mounted upon the cross-bar; a standard fixed to and rising from the cross-bar; a pitman comprising a head pivoted intermediate its ends upon the standard, said pitman being operatively connected with the cross-bar; pawls pivoted at their lower ends to the extremities of the head of the pitman and arranged to engage at their upper ends the teeth of the wheel upon opposite sides of the wheel, the pawls being alternately engageable by the standard to free the said pawls from the teeth of the wheel; and resilient means for holding the pawls in engagement with the teeth of the wheel.

3. A device of the class described comprising a frame; an earth-engaging wheel carried by the frame and provided upon either side with outstanding teeth; a cross-bar rigidly assembled with the frame; a cutter-bar slidably mounted upon the cross-bar; a standard fixed to and rising from the cross-bar; a pitman comprising a transversely disposed head pivoted intermediate its ends upon the standard, and a finger depending from the head and arranged to engage the cutter-bar; pawls pivoted at their lower ends to the extremities of the head of the pitman and arranged to engage, at their upper ends, the teeth of the wheel upon opposite sides of the wheel, the pawls being alternately engageable by the standard to free said pawls from the teeth of the wheel; and a retractile spring terminally assembled with the pawls intermediate the ends thereof.

4. A device of the class described comprising a frame; an earth-engaging wheel carried by the frame and provided upon either side with outstanding teeth; a cross-bar rigidly assembled with the frame; a cutter-bar slidably mounted upon the cross-bar; a standard fixed to and rising from the cross-bar; a pitman comprising a head pivoted intermediate its ends upon the standard, said pitman being operatively connected with the cutter-bar; pawls pivoted at their lower ends to the extremities of the head of the pitman and arranged to engage, at their upper ends, the teeth of the wheel upon opposite sides of the wheel, the pawls being provided at their upper extremities, with bifurcations to inclose the rim of the wheel, the bifurcations of one pawl being extended toward the bifurcations of the other pawl, the said bifurcations being alternately engageable by the standard to free the pawls from the teeth of the wheel; and resilient means for holding the pawls in engagement with the teeth of the wheel.

In testimony that I claim the foregoing as my own, I have hereto affixed my signature in the presence of two witnesses.

JAMES H. PEARSON.

Witnesses:
  J. L. Bess,
  Seth D. Bacon.